(12) United States Patent
Chang et al.

(10) Patent No.: US 7,925,110 B2
(45) Date of Patent: Apr. 12, 2011

(54) SYSTEM AND METHOD FOR FILTERING A POINT CLOUD

(75) Inventors: Chih-Kuang Chang, Tu-Cheng, Taipei Hsien (TW); Shan-Yang Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 749 days.

(21) Appl. No.: 12/014,109

(22) Filed: Jan. 15, 2008

(65) Prior Publication Data

US 2009/0048782 A1 Feb. 19, 2009

(30) Foreign Application Priority Data

Aug. 17, 2007 (CN) .......................... 2007 1 0201391

(51) Int. Cl.
*G06K 9/36* (2006.01)
(52) U.S. Cl. ......... 382/260; 382/154; 382/274; 382/275
(58) Field of Classification Search ................... 382/154, 382/260, 274, 275
See application file for complete search history.

(56) References Cited

U.S. PATENT DOCUMENTS

| | | | |
|---|---|---|---|
| 6,738,727 B2 | 5/2004 | Chang | |
| 6,996,290 B2 * | 2/2006 | Cariffe | 382/275 |
| 7,027,054 B1 * | 4/2006 | Cheiky et al. | 345/473 |
| 7,082,356 B2 * | 7/2006 | Mori | 701/29 |
| 7,298,289 B1 * | 11/2007 | Hoffberg | 340/903 |
| 7,308,139 B2 * | 12/2007 | Wentland et al. | 382/181 |

* cited by examiner

*Primary Examiner* — Yosef Kassa
(74) *Attorney, Agent, or Firm* — Frank R. Niranjan

(57) ABSTRACT

A method for filtering a point cloud is provided. The method includes: (a) acquiring a point cloud of an object from a point cloud obtaining device; (b) establishing a topological structure for the point cloud; (c) selecting a maiden point from the point cloud as a selected point; (d) searching a plurality of points which are near to the selected point from the point cloud according to the topological structure as near points of the selected point; (e) determining whether the selected point is a noise point by comparing coordinate values of the selected point and coordinate values of the near points; (f) deleting or smoothing the noise point from the point cloud; and repeating steps from (c) to (f), until all points in the point cloud have been selected. A related system is also provided.

12 Claims, 6 Drawing Sheets

SYSTEM AND METHOD FOR FILTERING A POINT CLOUD

BACKGROUND OF THE INVENTION

1. Field of the Invention

The present invention relates to point cloud editing systems and methods, particularly to a system and a method for filtering a point cloud.

2. Description of Related Art

Product quality has long been one of the most important factors in maintaining manufacturing enterprises competitiveness. Improving the product quality is an important ongoing pursuit of the manufacturing enterprises. It is essential to verify component correctness and accuracy of various manufactured products. There is now a burgeoning need to verify components of products rapidly and precisely. Nevertheless, many manufacturing enterprises still perform verification by employing numerous manual tasks and test programs that are non-standard. This can seriously affect the accuracy and consistency of the verification performed.

In recent years, with performances of computer hardware and software continually improving, computers play a major role when performing verification operations on an object. Computer equipment can greatly improve the efficiency and accuracy of verification. For example, a scanning device scans an object to be verified to obtain a point cloud, and inputs the point cloud to the computer to form a digitalized figure of the object. The object will be verified by analyzing and processing the point cloud by executing particular software installed in the computer. The art of analyzing and processing data on an object is disclosed in patents such as U.S. Pat. No. 6,738,727, entitled System and Methods for Analyzing and Processing data on an object. This invention can automatically measure the object and help to guide production by comparing the measurement data with the design data. The system comprises an automatic scanning and measuring sub-system for obtaining point cloud by scanning the object and generating measurement data on the object by processing the point cloud.

Even though the above-described system discloses how to obtain a point cloud, there are many noise points mixed within the point cloud, usually, 0.1%~5%. The noise points would influence the processing speed and accuracy of the point cloud.

Therefore, what is needed is a system and method for filtering a point cloud, which is capable of filtering the point cloud automatically and accurately.

SUMMARY OF THE INVENTION

A preferred embodiment provides a system for filtering a point cloud. The system includes an application server and a point cloud obtaining device. The application server connects to the point cloud obtaining device. The application server includes: a point cloud acquiring module configured for acquiring a point cloud of an object from the point cloud obtaining device; a topological structure establishing module configured for establishing a topological structure for the point cloud to make points of the point cloud confined in a plurality of related cubical grids; a point selecting module configured for selecting a maiden point from the point cloud as a selected point; a near points searching module configured for searching a plurality of points which are near to the selected point from the point cloud according to the topological structure as near points of the selected point; a noise point determining module configured for determining whether the selected point is a noise point by comparing coordinate values of the selected point with coordinate values of the near points; and a noise point filtering module configured for deleting or smoothing the noise point from the point cloud.

Another preferred embodiment provides a method for filtering a point cloud. The method includes: (a) acquiring a point cloud of an object from a point cloud obtaining device; (b) establishing a topological structure for the point cloud; (c) selecting a maiden point from the point cloud as a selected point; (d) searching a plurality of points which are near to the selected point from the point cloud according to the topological structure as near points of the selected point; (e) determining whether the selected point is a noise point by comparing coordinate values of the selected point and coordinate values of the near points; (f) deleting or smoothing the noise point from the point cloud; and repeating steps from (c) to (f), until all points in the point cloud have been selected.

Other advantages and novel features of the present invention will become more apparent from the following detailed description of preferred embodiment when taken in conjunction with the accompanying drawings, in which:

DETAILED DESCRIPTION OF THE INVENTION

Figure 1:
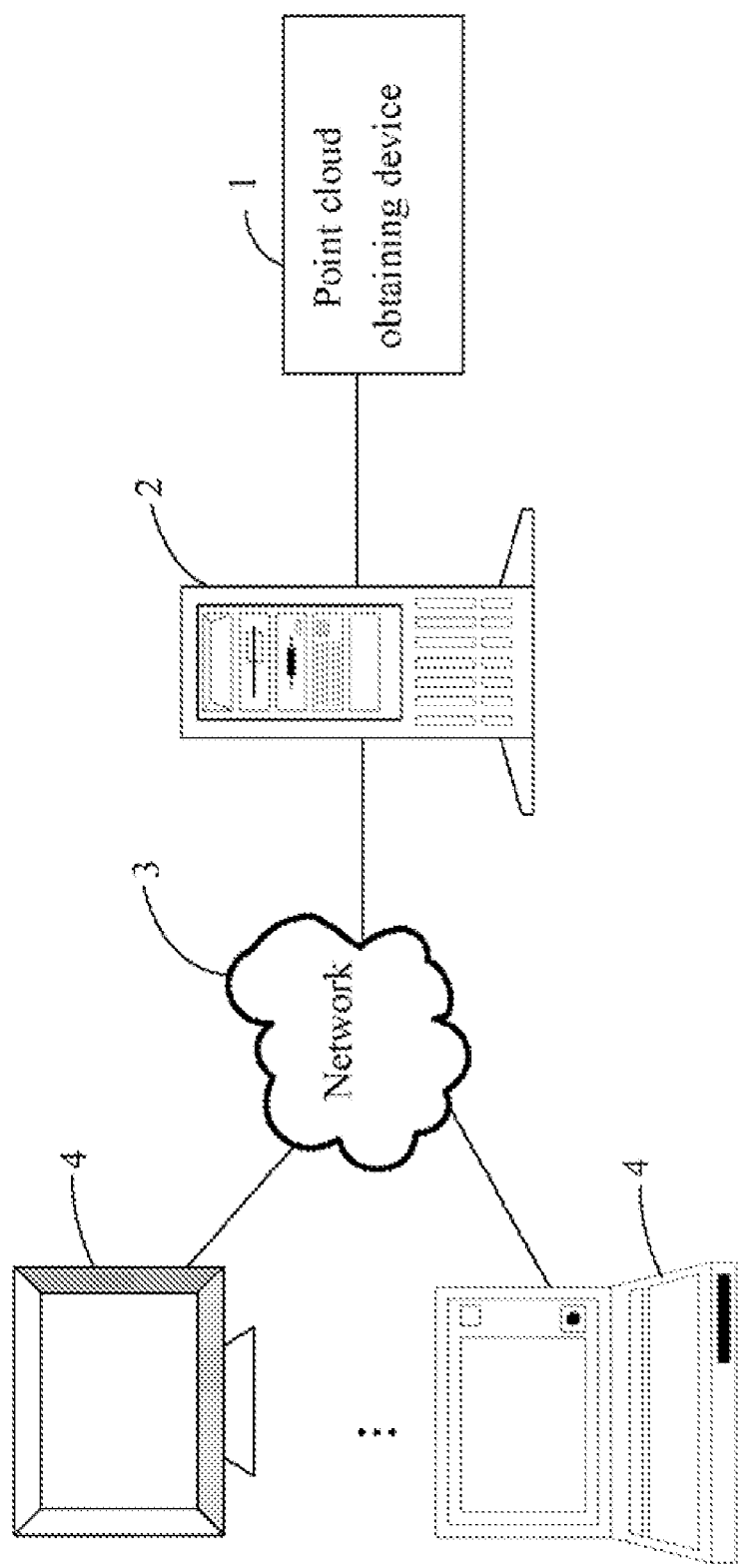
FIG. 1 is a schematic diagram of hardware configuration of a system for filtering a point cloud in accordance with a preferred embodiment.

FIG. 1 is a schematic diagram of a hardware configuration of a system for filtering a point cloud (hereinafter, "the system") in accordance with a preferred embodiment. The system typically includes a point cloud obtaining device 1, an application server 2, and a plurality of client computers 4 (only two shown). The client computers 4 connect to the application server 2 via a network 3. The network 3 may be an intranet, the Internet, or any other suitable type of communication links.

The point cloud obtaining device 1 connects with the application server 2, and is provided for obtaining a point cloud by scanning a physical object. In the preferred embodiment, the point cloud obtaining device 1 can be a laser scanner or any other suitable device known in the art.

The application server 2 is configured for simulating a digitalized figure based on the point cloud, and deleting/smoothing noise points in the digitalized figure to obtain a filtered point cloud. The application server 2 is installed with a plurality of software function modules that are used for processing the point cloud. The client computers 4 may be located at various locations (e.g. different internal departments) of an organization with the system. Each client computer 4 provides a graphical user interface (GUI) for displaying the digitalized figure.

Figure 2:
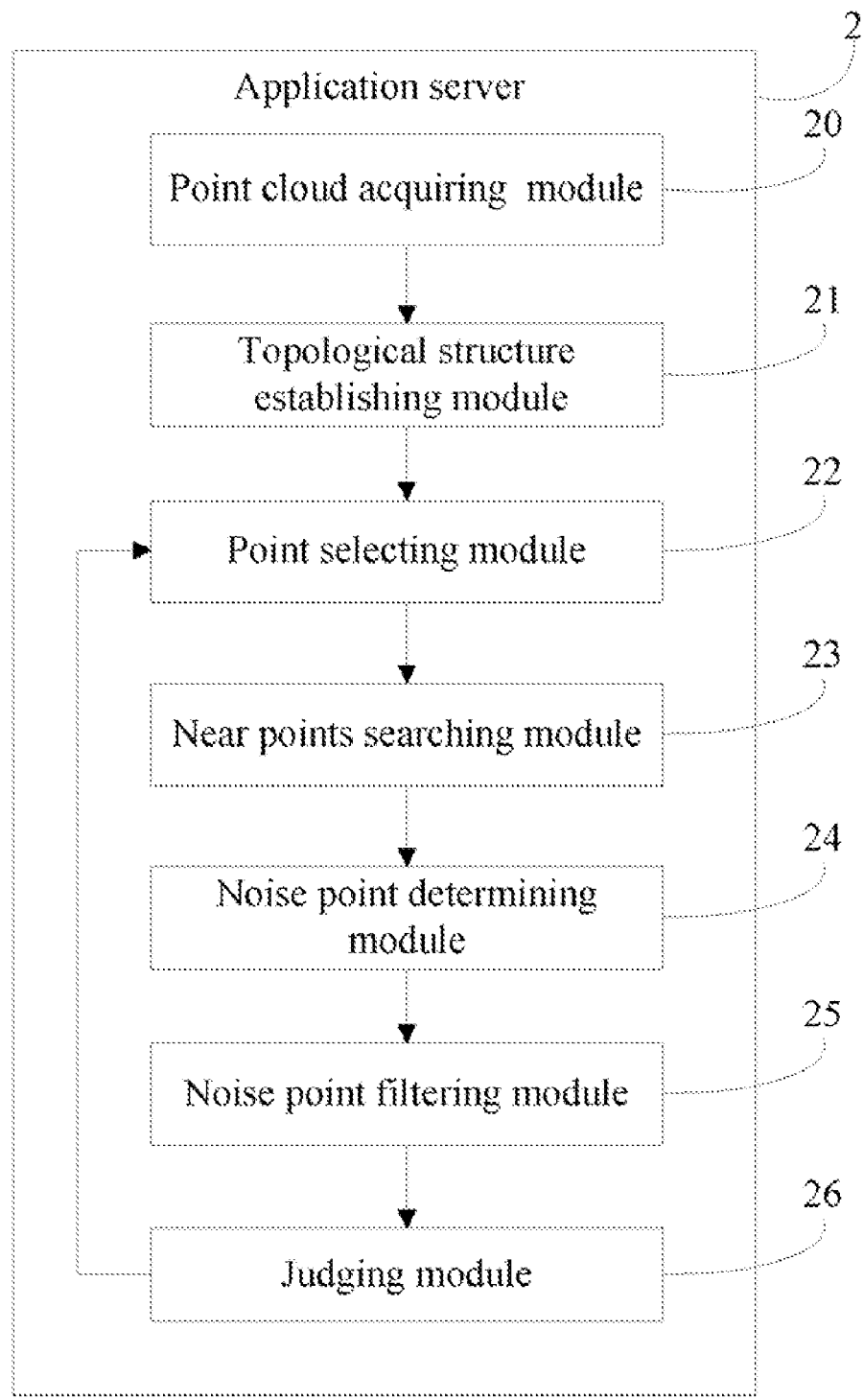
FIG. 2 is a block diagram of function modules of an application server in FIG. 1.

FIG. 2 is a block diagram of function modules of the application server 2 in FIG. 1. The application server 2 typically includes: a point cloud acquiring module 20, a topological structure establishing module 21, a point selecting module 22, a near points searching module 23, a noise point determining module 24, a noise point filtering module 25, and a judging module 26.

The point cloud acquiring module 20 is configured for acquiring the point cloud from the point cloud obtaining device 1, simulating the digitalized figure based on the point cloud, and displaying the digitalized figure on the GUI of any client computer 4.

The topological structure establishing module 21 is configured for establishing a topological structure for the point cloud, namely constructing a relationship between the points of the point cloud. Specifically, the topological structure establishing module 21 first identifies an outermost point on each surface edge of the point cloud by analyzing coordinates values of the points in the point cloud, and determines a cubical figure that can confine the point cloud. Secondly, the topological structure establishing module 21 retrieves a length, a width and a height of the cubical figure. Finally, the topological structure establishing module 21 maps a grid on the cubical figure according to the length, the width, the height of the cubical figure and an axes interval of the grid that is preconfigured by a user. Specifically, the topological structure establishing module 21 first computes an axes quantity in surfaces of the cubical figure based on the length, the width, the height of the cubical figure and the axes interval of the grid, and then divides the cubical figure into a plurality of cubical grids according to the axes quantity of each surface of the cubical figure. Thus, the points of the point cloud may be separately confined in different cubical grids. According to the axes interval of the grid and the density of the point cloud, each cubical grid may confine one or more points. The topological structure establishing module 21 is further configured for configuring serial numbers for the cubical grids, for example, "001", "002", . . . , "xxx"; and for relating each of the cubical grids with twenty-six cubical grids which are adjacent to the cubical grid in three-dimensional space by saving the serial numbers of the twenty-seven cubical grids into a table.

The point selecting module 22 is configured for selecting a maiden point which has not been selected (hereinafter referred to as "selected point") from the point cloud.

The near points searching module 23 is configured for searching a plurality of points which are near to the selected point (hereinafter referred to as "near points") from the point cloud according to the topological structure. Specifically, the near points searching module 23 first searches the serial number "xxx" of the cubical grid which confines the selected point, then searches twenty-six cubical grids which adjacent to the cubical grid "xxx" from the cubical figure according to the serial number "xxx", and finally computes distances between the selected point and all points confined in the twenty-seven cubical grids (including the cubical grid which confines the selected point and the twenty-six adjacent cubical grids) to obtain a plurality of near points (9~15 points is better) according to the distances.

The noise point determining module 24 is configured for determining whether the selected point is a noise point by comparing the coordinate values of the selected point with the coordinate values of the near points. Specifically, the noise point determining module 24 arranges x-coordinate values, y-coordinate values and z-coordinate values of the selected point and the near points respectively into three arrays (namely X-array, Y-array, and Z-array) in an ascending sequence or in a descending sequence. Secondly, the noise point determining module 24 determines whether at least one of the x-coordinate value, the y-coordinate value, and the z-coordinate value of the selected point is at the ends of the corresponding X-array, Y-array, and Z-array. If at least one value is at the ends of the corresponding array, the noise point determining module 24 ascertains that the selected point is a noise point. Otherwise, if none of the x-coordinate value, the y-coordinate value and the z-coordinate value of the selected point is at the ends of the corresponding array, the noise point determining module 24 ascertains that the selected point is a normal point.

The noise point filtering module 25 is configured for deleting or smoothing the noise point. If only one of the x-coordinate value, the y-coordinate value, and the z-coordinate value of the selected point is at the ends of the corresponding array, the noise point filtering module 25 smoothes the noise point. Otherwise, if at least two values of the x-coordinate value, the y-coordinate value, and the z-coordinate value of the selected point are at the ends of the corresponding array, the noise point filtering module 25 deletes the noise point from the point cloud.

Smoothing the noise point means changing the noise point to a normal point by correcting the coordinate values of the noise point. Usually, smoothing the noise point can use a mean value method or an intermediate value method. The mean value method is that replacing the x-coordinate value or the y-coordinate value or the z-coordinate value of the selected point with a mean coordinate value of the x-coordinate values, or the y-coordinate values, or the z-coordinate values of the near points. The intermediate value method is that replacing the x-coordinate value, or the y-coordinate value, or the z-coordinate value of the selected point with an intermediate coordinate value of the x-coordinate values, or the y-coordinate values, or the z-coordinate values of the near points.

The judging module 26 is mainly configured for determining whether all points in the point cloud have been selected by the point selected module 22. If at least one point in the point cloud has not been selected, the point selected module 22 selects another maiden point from the point cloud.

Figure 3:
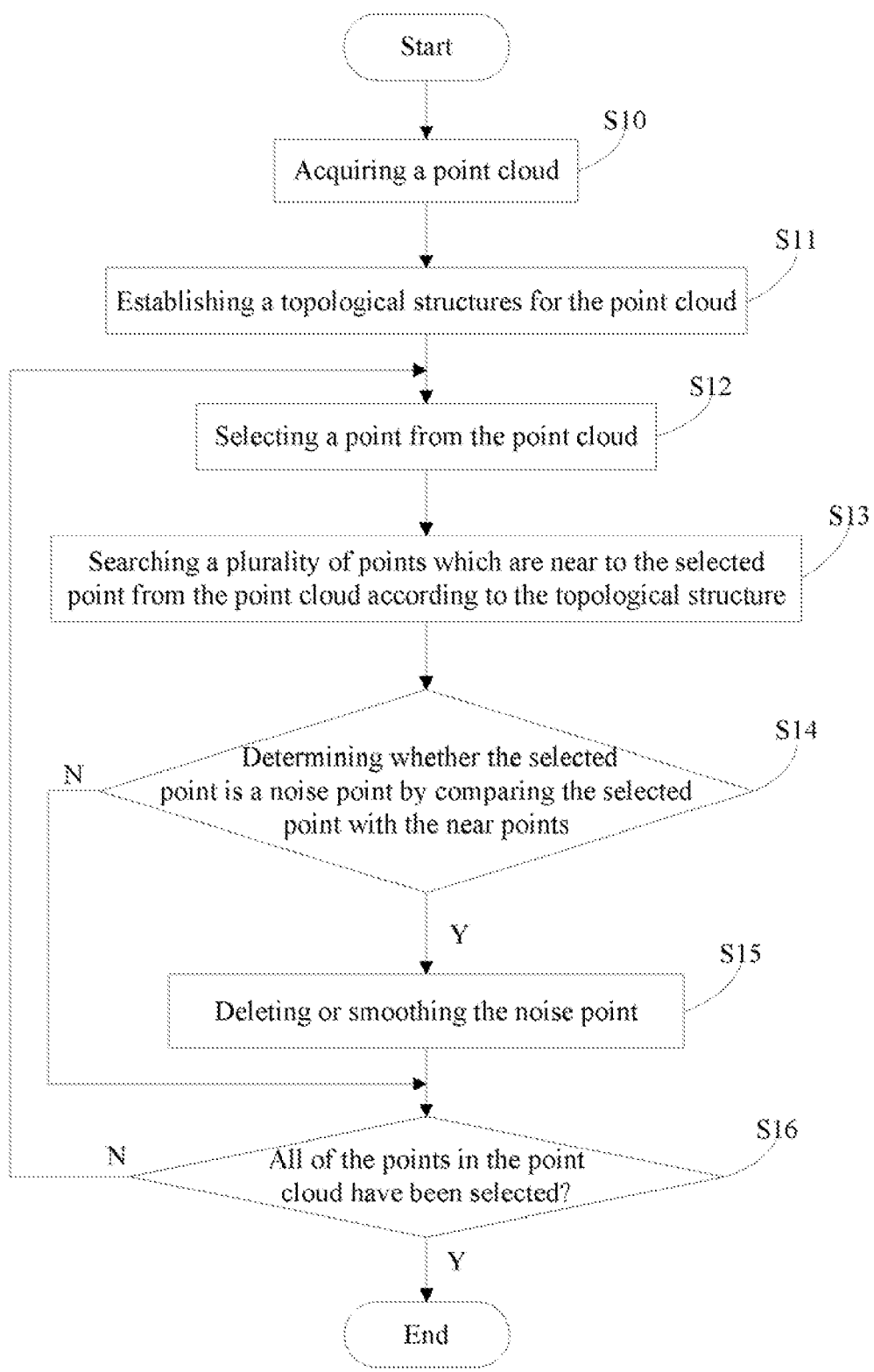
FIG. 3 is a main flowchart illustrating a method for filtering a point cloud in accordance with a preferred embodiment.

FIG. 3 is a main flowchart illustrating a method for filtering a point cloud in accordance with a preferred embodiment.

In step S10, the point cloud acquiring module 20 acquires a point cloud from the point cloud obtaining device 1, simulates a digitalized figure based on the point cloud, and displays the digitalized figure on the GUI of any client computer 4.

In step S11, the topological structure establishing module 21 establishes a topological structure for the point cloud, namely constructing a relationship between the points of the point cloud. Detailed steps of establishing the topological structure will be depicted in FIG. 4.

In step S12, the point selecting module 22 selects a maiden point (hereinafter referred as to "selected point") from the point cloud.

In step S13, the near points searching module 23 searches a plurality of points (9~15 points is better) which are near to the selected point (hereinafter referred to as "near points") from the point cloud according to the topological structure. Detailed steps of searching the near points will be depicted in FIG. 5.

In step S14, the noise point determining module 24 determines whether the selected point is a noise point by comparing the coordinate values of the selected point and the coordinate values of the near points. Detailed steps of determining a noise point will be depicted in FIG. 6.

in step S15, the noise point filtering module 25 deletes the selected point or smoothes the selected point if the selected point is a noise point.

If the selected point is not a noise point, or the noise point filtering module 25 has deleted or smoothed the selected point, in step S16, the judging module 26 judges whether all of the points in the point cloud have been selected by the point selecting module 22. If at least one point in the point cloud has not been selected, the procedure returns to the step S12, the point selected module 22 selects another maiden point from the point cloud. Otherwise, if all the points in the point cloud have been selected, the procedure ends.

Figure 4:
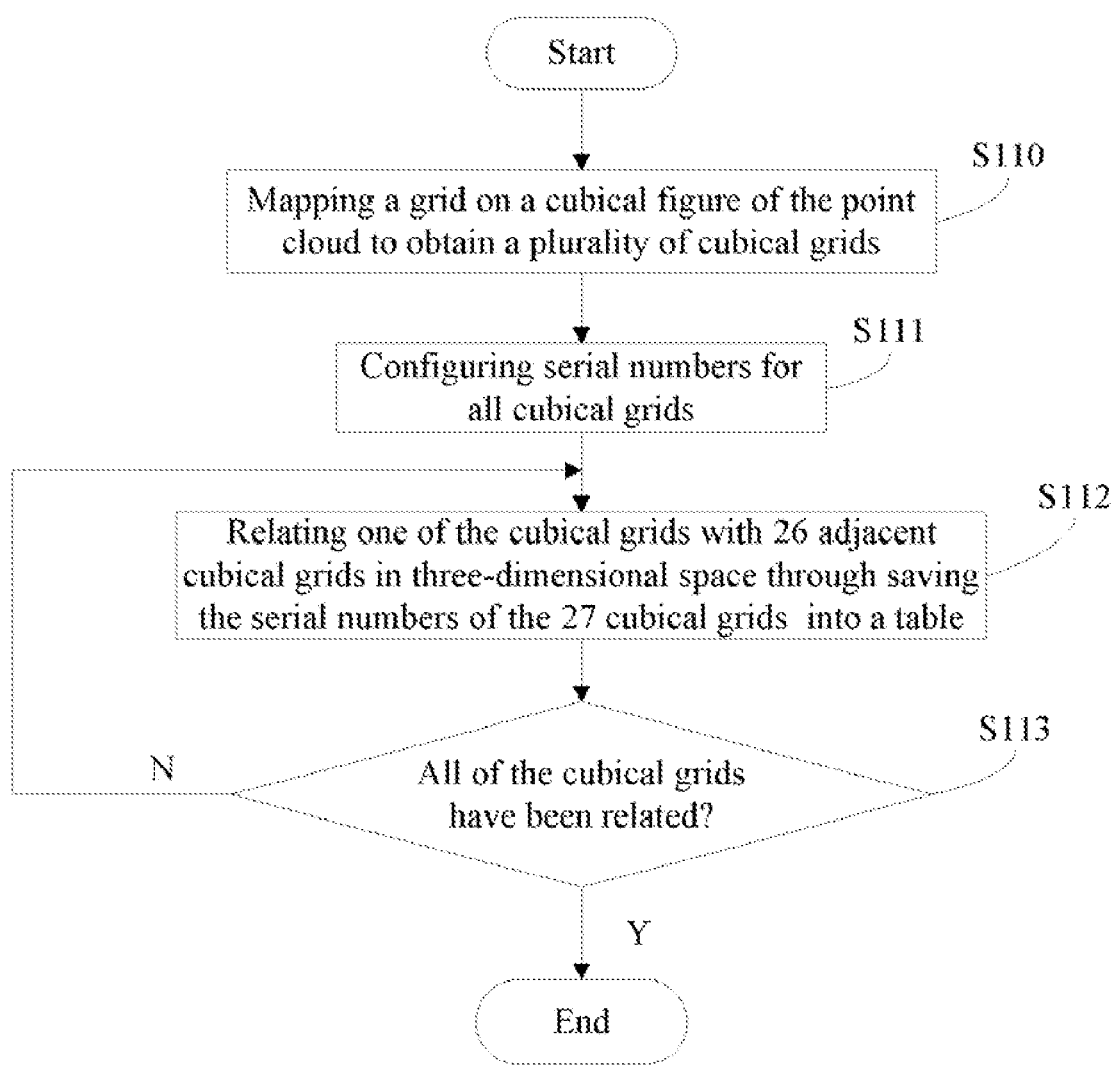
FIG. 4 is a detailed flowchart illustrating step S11 in FIG. 3.

FIG. 4 is a detailed flowchart illustrating the step S11 in FIG. 3, namely how to establish a topological structure for the point cloud.

In step S110, the topological structure establishing module 21 first identifies an outermost point on each surface edge of the point cloud by analyzing coordinates values of the points in the point cloud, and determines a cubical figure that can confine the point cloud. Secondly, the topological structure establishing module 21 retrieves a length, a width and a height of the cubical figure. Finally, the topological structure establishing module 21 computes an axes quantity in surfaces of the cubical figure based on the length, the width, the height of the cubical figure and an axes interval of the grid preconfigured by the user, and then divides the cubical figure into a plurality of cubical grids according to the axes quantity of each surface of the cubical figure. Thus, the points in the point cloud may be separately confined in different cubical grids. According to the axes interval of the grid and the density of the point cloud, each cubical grid may confine one or more points.

In step S111, the topological structure establishing module 21 configures serial numbers for all cubical grids, for example, "001", "002", . . . , "xxx".

In step S112, the topological structure establishing module 21 relates one of the cubical grids with twenty-six cubical grids that are adjacent to the cubical grid in three-dimensional space by saving the serial numbers of the twenty-seven cubical grids into a table.

In step S113, the judging module 25 judges whether all cubical grids have been related. If no, the procedure returns to step S112 depicted above. Otherwise, if all cubical grids have been related, the procedure ends.

Figure 5:
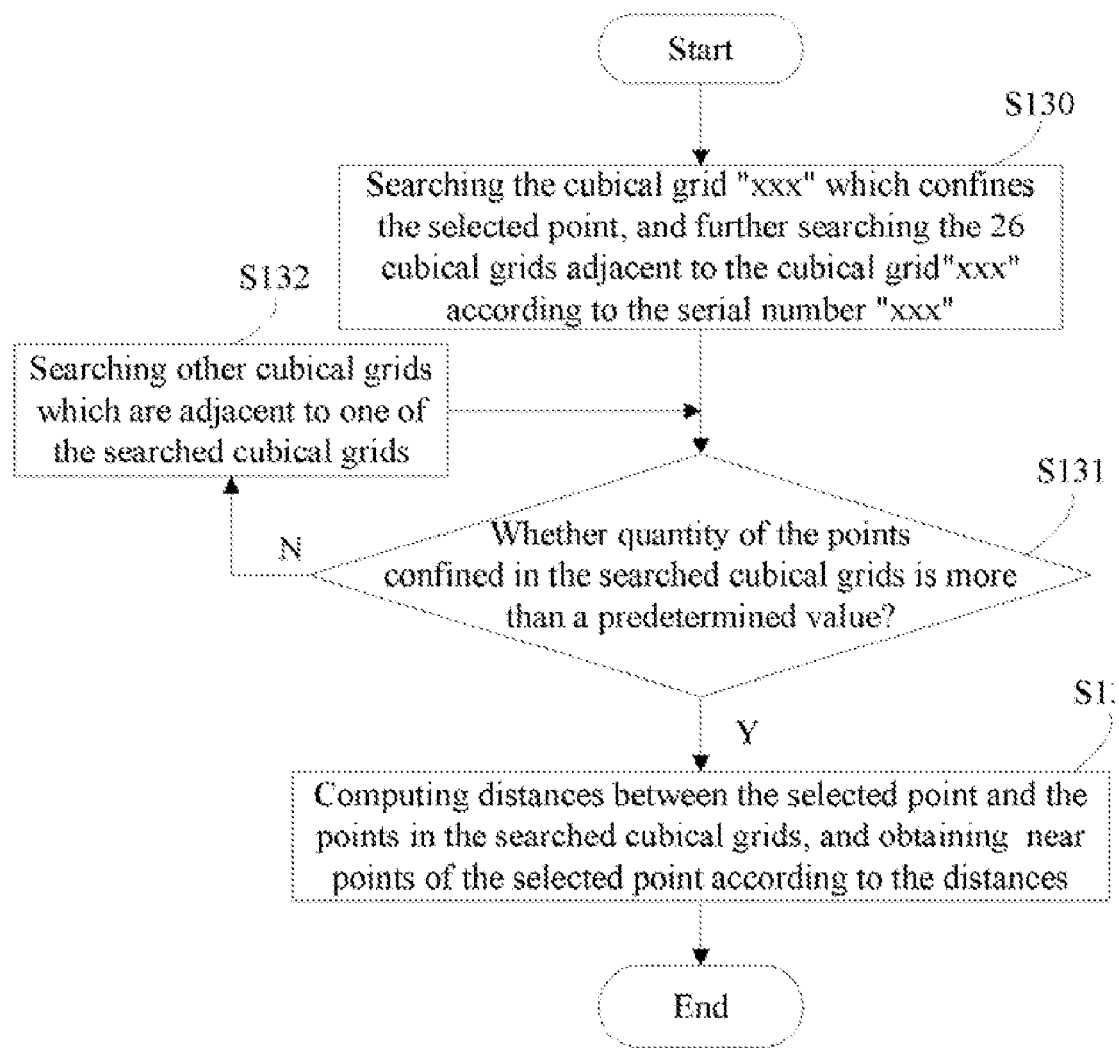
FIG. 5 is a detailed flowchart illustrating step S13 in FIG. 3.

FIG. 5 is a detailed flowchart illustrating the step S13 in FIG. 3, namely how to search near points of the selected point.

In step S130, the near points searching module 23 searches the serial number "xxx" of the cubical grid which confines the selected point, and searches the twenty-six cubical grids which are adjacent to the cubical grid "xxx" from the cubical figure according to the serial number "xxx".

In step S131, the judging module 26 judges whether the quantity of the points confined in the twenty-seven cubical grids (including the cubical grid "xxx" and the adjacent twenty-six cubical grids) is more than a predetermined value, more than 9 points, for example.

If the quantity is less than the predetermined value, in step S132, the near points searching module 23 searches other cubical grids which are adjacent to one of the twenty-six cubical grids that have been searched.

Until the quantity of the points confined in the cubical grid "xxx" and the searched cubical grids is more than the predetermined value, in step S133, the near points searching module 23 computes a distance between the selected point and each of the points which confined in the cubical grid "xxx" and the searched cubical grids to obtain a plurality of near points, 9~15 points is better, according to the distances.

Figure 6:
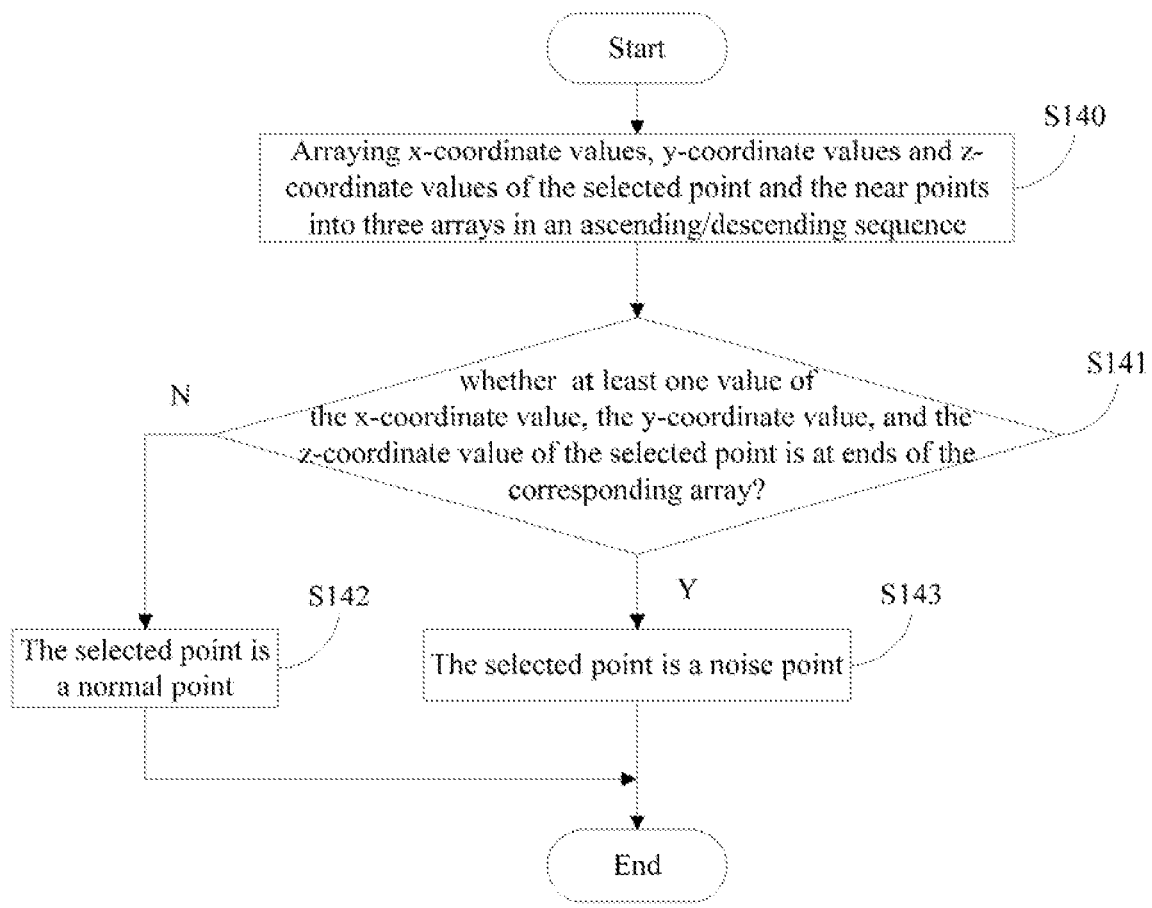
FIG. 6 is a detailed flowchart illustrating step S14 in FIG. 3.

FIG. 6 is a detailed flowchart illustrating step S14 in FIG. 3, namely how to determine whether a selected point is a noise point.

In step S140, the noise point determining module 24 respectively arranges x-coordinate values, y-coordinate values and z-coordinate values of the selected point and the near points into three arrays, namely X-array, Y-array, and Z-array, in an ascending sequence or in a descending sequence.

In step S141, the noise point determining module 24 determines whether at least one value of the x-coordinate value, the y-coordinate value and the z-coordinate value of the selected point is at the ends of the corresponding X-array, Y-array, and Z-array.

If none of the x-coordinate value, the y-coordinate value and the z-coordinate value of the selected point is at the ends of the corresponding array, in step S142, the noise point determining module 24 ascertains that the selected point is a normal point. Otherwise, if at least one of the x-coordinate value, the y-coordinate value and the z-coordinate value of the selected point is at the ends of the corresponding array, in step S143, the noise point determining module 24 ascertains that the selected point is a noise point.

In step S15 of FIG. 3, the noise filtering module 25 deletes the noise point if at least two values of the x-coordinate value, the y-coordinate value and the z-coordinate value of the selected point are at the ends of the corresponding array. Otherwise, the noise filtering module 25 smoothes the noise point if only one of the x-coordinate value, the y-coordinate value and the z-coordinate value of the selected point is at the ends of the corresponding array. Smoothing the selected point can be using a mean value method or an intermediate value method. The mean value method is that replacing the x-coordinate value, or the y-coordinate value, or the z-coordinate value of the selected point with a mean coordinate value of the x-coordinate values, or the y-coordinate values, or the z-coordinate values of the near points. The intermediate value method is that replacing the x-coordinate value, or the y-coordinate value, or the z-coordinate value of the selected point with an intermediate coordinate value of the x-coordinate values, or the y-coordinate values, or the z-coordinate value of the near points.

It should be emphasized that the above-described embodiments of the present invention are merely possible examples of implementations, merely set forth for a clear understanding of the principles of the invention. For example, the 9~15 near points only represents a better range, and not by way of limitation. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for filtering a point cloud, the system comprising an application server connected to a point cloud obtaining device, the application server comprising:

a point cloud acquiring module configured for acquiring a point cloud of an object from the point cloud obtaining device;

a topological structure establishing module configured for establishing a topological structure for the point cloud to make points of the point cloud confined in a plurality of related cubical grids;

a point selecting module configured for selecting a maiden point from the point cloud as a selected point;

a near points searching module configured for searching a plurality of points which are near to the selected point from the point cloud according to the topological structure as near points of the selected point;

a noise point determining module configured for determining whether the selected point is a noise point by comparing coordinate values of the selected point with coordinate values of the near points; and a noise point filtering module configured for deleting or smoothing the noise point from the point cloud.

2. The system as described in claim 1, wherein the near points of the selected point are in the cubical grid which confines the selected point and/or in the cubical grids adjacent to the cubical grid which confines the selected point.

3. The system as described in claim 1, wherein the application server further comprises a judging module configured for judging whether all points in the point cloud have been selected.

4. The system as described in claim 1, wherein the topological structure establishing module establishes the topological structure for the point cloud by way of:

identifying an outermost point on each surface edge of the point cloud by analyzing coordinates values of the points in the point cloud;

determining a cubical figure that confine the point cloud, and retrieving a length, a width and a height of the cubical figure; and mapping the cubical figure into a plurality of cubical grids according to the length, the width, the height of the cubical figure and an axes interval of the grid that is preconfigured by a user.

5. The system as described in claim 2, wherein the noise point determining module determines whether the selected point is a noise point by way of:

arranging x-coordinate values, y-coordinate values and z-coordinate values of the selected point and the near points into three arrays in an ascending sequence or in a descending sequence respectively;

determining whether at least one of the x-coordinate value, the y-coordinate value and the z-coordinate value of the selected point is at the ends of the corresponding array;

ascertaining that the selected point is a normal point if none of the x-coordinate value, the y-coordinate value and the z-coordinate value of the selected point is at the ends of the corresponding array; or ascertaining that the selected point is a noise point if at least one of the x-coordinate value, the y-coordinate value and the z-coordinate value of the selected point is at the ends of the corresponding array.

6. The system as described in claim 5, wherein the noise point filtering module smoothes the noise point if only one value of the x-coordinate value, the y-coordinate value and the z-coordinate value of the selected point is at the ends of the corresponding array, or deletes the noise point if at least two values of the x-coordinate value, the y-coordinate value and the z-coordinate value of the selected point are at the ends of the corresponding array.

7. A computer-enabled method for filtering a point cloud, the method comprising steps of:

(a) acquiring a point cloud of an object from a point cloud obtaining device;

(b) establishing a topological structure for the point cloud;

(c) selecting a maiden point from the point cloud as a selected point;

(d) searching a plurality of points which are near to the selected point from the point cloud according to the topological structure as near points of the selected point;

(e) determining whether the selected point is a noise point by comparing coordinate values of the selected point and coordinate values of the near points;

(f) deleting or smoothing the noise point from the point cloud; and repeating steps from (c) to (f), until all points in the point cloud have been selected.

8. The method as described in claim 7, wherein the step (b) comprises steps of:

(b1) identifying an outermost point on each surface edge of the point cloud by analyzing coordinates values of the points in the point cloud, and determining a cubical figure that confine the point cloud;

(b2) retrieving a length, a width and a height of the cubical figure;

(b3) computing an axes quantity in surfaces of the cubical figure according to the length, the width, the height of the cubical figure and an axes interval of the grid preconfigured by a user;

(b4) mapping the cubical figure into a plurality of cubical grids according to the axes quantity of each surface of the cubical figure;

(b5) configuring serial numbers for all cubical grids;

(b6) relating one of the cubical grids with twenty-six cubical grids which are adjacent to the cubical grid in three-dimensional space by saving the serial numbers of the twenty-seven cubical grids into a table; and repeating step (b6) until all cubical grids have been related.

9. The method as described in claim 8, wherein the step (d) comprises steps of:

(d1) obtaining a serial number of the cubical grid which confines the selected point, and searching twenty-six cubical grids which are adjacent to the cubical grid according to the serial number;

(d2) judging whether quantity of the points confined in the searched cubical grids is more than a predetermined value;

(d3) searching other cubical grids which are adjacent to one of the searched cubical grids until the quantity of the points is more than the predetermined value; and (d4) computing a distance between the selected point and each of the points that is confined in the searched cubical grids to obtain the near points of the selected point according to the distances.

10. The method as described in claim 7, wherein the step (e) comprises steps of:

(e1) respectively arranging x-coordinate values, y-coordinate values and z-coordinate values of the selected point and the near points into three arrays in an ascending sequence or in a descending sequence;

(e2) determining whether at least one of the x-coordinate value, y-coordinate value and z-coordinate value of the selected point is at the ends of the corresponding array; and (e3) ascertaining the selected point is a noise point if at least one is at the end of the corresponding array; or (e4) ascertaining the selected point is a normal point if none of the x-coordinate value, y-coordinate value and z-coordinate value of the selected point is at the ends of the corresponding array.

11. The method as described in claim 10, wherein step (f) comprises steps of:
smoothing the noise point if only one of the x-coordinate value, y-coordinate value and z-coordinate value of the selected point is at the ends of the corresponding array; or
deleting the noise point if at least two values of the x-coordinate value, y-coordinate value and z-coordinate value of the selected point are at the ends of the corresponding array.

12. The method as described in claim 11, wherein the means of smoothing the selected point can be using a mean value method or an intermediate value method.

* * * * *